Patented June 25, 1935

2,006,221

UNITED STATES PATENT OFFICE 2,006,221

REGENERATION OF PLATINUM CATALYSTS

Earl S. Ridler, Shaker Heights, Ohio, assignor to The Grasselli Chemical Company, Cleveland, Ohio, a corporation of Delaware No Drawing. Application June 22, 1933, Serial No. 677,173

15 Claims. (Cl. 23—238)

The present invention relates to the regeneration of platinum catalysts in which the active platinum is deposited on an inert carrier and consists in treating the spent catalyst with a liquid preparation of a volatile, organic carboxylic acid.

Platinum catalysts in which platinum is deposited on an inert carrier are used mainly in gas phase reactions of which the oxidation of $SO_2$ to $SO_3$ for the manufacture of sulfuric acid is of the greatest importance. Supported platinum catalysts are used to some extent in other gas phase reactions such as the oxidation of methanol to formaldehyde, the oxidation of acetaldehyde to acetic acid, the reduction of pyridine to piperidine, the reduction of acid chlorides, reduction of acetylene homologues, etc. My present invention is primarily intended for the regeneration of platinum contact masses as used in the manufacture of sulfuric acid but it can also be used for treating spent masses used in other gas phase reactions.

Platinized, supported catalysts used in gas phase reactions consist commonly of finely divided platinum deposited on a more or less inert carrier such as asbestos, magnesium sulfate, diatomaceous earth, silicic acid gel, etc. These masses do not have an indefinite life, or economical activity, and must from time to time be regenerated or re-activated.

The regeneration process heretofore exclusively used, as far as I know, consists in removing the spent mass from the reaction converter, screening out dust and scale, treating the mass with a solution of aqua regia and then replacing the mass in the converter. The active period of such a regenerated mass becomes shorter and shorter between successive regenerations and it must finally be reworked to recover the platinum and a new mass installed in the converters.

I have found that by treatment of spent platinum catalysts with liquid preparations of volatile, organic carboxylic acids the activity of the masses is substantially restored and that the so regenerated masses can be successfully re-used to convert $SO_2$ to $SO_3$ or for catalyzing other gas phase reactions.

The organic carboxylic acids which I found useful in my process are those acids which are substantially soluble in water, alcohol or other easily volatile solvent and which are completely volatile at elevated temperatures, such as for instance below 400° C.; acids which are decomposed at such temperatures and leave no substantial residues on the masses, such as oxalic acid, are considered to be volatile for the present purposes. Acids of this type which were found useful in my invention are, for instance, acetic acid, acrylic acid, butyric acid, benzoic acid, lactic acid, phthalic acid, propionic acid, oxalic acid, succinic acid. These acids are all commercially available and are soluble in various volatile solvents.

In the performance of my invention I impregnate the spent catalyst with a liquid preparation of the desired carboxylic acid, if necessary I separate the mass from the excess liquid and heat the impregnated masses until the treating agent is removed either by volatilization, by restless decomposition, or by other convenient means.

Two important points are to be observed in carrying out my regeneration process: no residue is to remain on the mass after treatment and the carboxylic acid must first be applied at ordinary temperature in liquid form, as a treatment of the spent catalyst with vapors of the carboxylic acid does not have the same regenerative effect as a treatment with a liquid preparation.

Carboxylic acids which are liquid at ordinary temperatures, such as acetic acid, can be applied directly to the spent masses but in general I prefer to use concentrated solutions of the acids, water being in all cases the preferred solvent, though I can use solutions in alcohol, acetone, benzol, etc. which can easily be eliminated by evaporation.

When the catalyst carrier is insoluble in the solvent used for the carboxylic acid, I can simply wash the catalyst directly in the converter with the solution taking care that the mass is well impregnated with the carboxylic acid, I then apply heat to volatilize the acid and the solvent.

In many instances, such a treatment would involve mechanical difficulties in which cases I prefer to remove the spent catalyst from the apparatus and treat it separately. This is particularly indicated when the catalyst carrier is soluble in the treating agent. This case presents itself in the regeneration of platinized magnesium sulfate catalysts as used in the oxidation of $SO_2$ to $SO_3$. I remove this spent catalyst and spread it out on wooden trays where I spray it, for instance, with an aqueous solution of acetic acid until the mass is physically saturated with the acid. The mass is then returned to the converter, slowly heated up to the reaction temperature possibly while passing a stream of air through the apparatus, whereby the acetic acid and the water are distilled. When the conversion temperature is reached I introduce the sulfur dioxide and air and the catalyst will be found to have recovered its activity.

The present application contains subject matter in common with my application Ser. No. 656,045, filed Feb. 9, 1933.

I claim:

1. The process of regenerating a spent platinum catalyst deposited on a carrier which comprises impregnating said catalyst with a liquid preparation of a volatile organic carboxylic acid and substantially completely removing said treating agent from said catalyst.

2. The process of regenerating a spent platinum catalyst deposited on a carrier which comprises impregnating said catalyst with a solution of a volatile organic carboxylic acid in a volatile solvent, and heating said catalyst to completely evaporate said carboxylic acid and said solvent.

3. The process of regenerating a spent platinum catalyst deposited on a carrier which comprises impregnating said catalyst with an aqueous solution of an organic carboxylic acid and heating said catalyst to completely evaporate said carboxylic acid and the water.

4. The process of regenerating a spent platinum catalyst deposited on a carrier which comprises impregnating said catalyst with acetic acid in liquid form and heating said catalyst to completely evaporate said acetic acid.

5. The process of regenerating a spent platinum catalyst deposited on a carrier which comprises impregnating said catalyst with a solution of benzoic acid in a volatile solvent and heating said catalyst to completely remove said acid and solvent.

6. The process of regenerating a spent platinum catalyst deposited on a carrier which comprises impregnating said catalyst with an aqueous solution of oxalic acid and heating said impregnated catalyst until complete removal of said acid and water.

7. The process of regenerating a spent platinized magnesium sulfate sulfuric acid catalyst which comprises impregnating said catalyst with a concentrated aqueous acetic acid and heating said impregnated catalyst to temperatures of about 400° C.

8. The process of regenerating a spent, pelleted, platinized magnesium sulfate catalyst which comprises spraying a liquid preparation of an organic, volatile carboxylic acid upon said mass and heating the sprayed mass until said liquid preparation is substantially completely removed from said mass.

9. The process of regenerating a spent platinum catalyst deposited on a carrier, said catalyst having been used in the oxidation of sulfur dioxide to sulfur trioxide, which comprises impregnating said catalyst with a liquid preparation of a volatile organic carboxylic acid and substantially completely removing said treating agent from said catalyst.

10. The process of regenerating a spent platinum catalyst deposited on a carrier, said catalyst having been used in the oxidation of sulfur dioxide to sulfur trioxide, which comprises impregnating said catalyst with a solution of a volatile organic carboxylic acid in a volatile solvent, and heating said catalyst to completely evaporate said carboxylic acid and said solvent.

11. The process of regenerating a spent platinum catalyst deposited on a carrier, said catalyst having been used in the oxidation of sulfur dioxide to sulfur trioxide, which comprises impregnating said catalyst with an aqueous solution of an organic carboxylic acid and heating said catalyst to completely evaporate said carboxylic acid and said water.

12. The process of regenerating a spent platinum catalyst deposited on a carrier, said catalyst having been used in the oxidation of sulfur dioxide to sulfur trioxide, which comprises impregnating said catalyst with acetic acid in liquid form and heating said catalyst to completely evaporate said acetic acid.

13. The process of regenerating a spent platinum catalyst deposited on a carrier, said catalyst having been used in the oxidation of sulfur dioxide to sulfur trioxide, which comprises impregnating said catalyst with a solution of benzoic acid in a volatile solvent, and heating said catalyst to completely remove said acid and solvent.

14. The process of regenerating a spent platinum catalyst deposited on a carrier, said catalyst having been used in the oxidation of sulfur dioxide to sulfur trioxide, which comprises impregnating said catalyst with an aqueous solution of oxalic acid and heating said impregnated catalyst until complete removal of said acid and water.

15. The process of regenerating a spent, pelleted, platinized magnesium sulfate catalyst, said catalyst having become inactive during its use in the oxidation of sulfur dioxide to sulfur trioxide, which comprises spraying a liquid preparation of an organic, volatile carboxylic acid upon said mass and heating the sprayed mass until said liquid preparation is substantially completely removed from said mass.

EARL S. RIDLER.